Sept. 25, 1951 A. LIGUORI 2,569,321

COMPENSATING AMPLIFIER FOR FACSIMILE RECORDING LAMPS

Filed June 30, 1948 2 Sheets-Sheet 1

Inventor
ANTHONY LIGUORI

By
Olin J. Mitchell
Attorney

COMPENSATING AMPLIFIER FOR FACSIMILE RECORDING LAMPS

Filed June 30, 1948 2 Sheets-Sheet 2

Inventor
ANTHONY LIGUORI
By
Olin J Mitchell
Attorney

Patented Sept. 25, 1951

2,569,321

UNITED STATES PATENT OFFICE 2,569,321

COMPENSATING AMPLIFIER FOR FACSIMILE RECORDING LAMPS

Anthony Liguori, New York, N. Y., assignor to Radio Corporation of America, a corporation of Delaware Application June 30, 1948, Serial No. 36,031

1 Claim. (Cl. 179—171)

The present invention relates to compensation amplifier systems and, more particularly, but not necessarily exclusively, to a novel amplifier system for use in conjunction with a recording device having a non-linear operating characteristic which includes an extended linear operating range.

The system of this invention affords a means for obtaining a new result from the operation of a recorder having an extended linear portion of a non-linear total characteristic. The non-linear portion of the characteristic is also available as a continuation of the linear portion for recording purposes in accordance with the invention.

More specifically, the present invention is applicable to facsimile recording systems and it may be used with signals having a varying characteristic, such as a varying amplitude. The varying amplitude may be produced originally by a facsimile scanner. Recording is effected in accordance with the invention in such a manner that a non-linear portion of the characteristic of a recording instrumentality or device is compensated for without in anyway altering the effectiveness of another portion of the characteristic arising from its linearity.

One object of the present invention is to provide a novel amplifier system in which the operation thereof is modified in a desired manner through a portion only of its operating range.

A further object of the invention resides in the provision of novel means for obtaining a bias for an amplifier stage which is effective only through a portion of the operating range of the amplifier.

Figure 1:
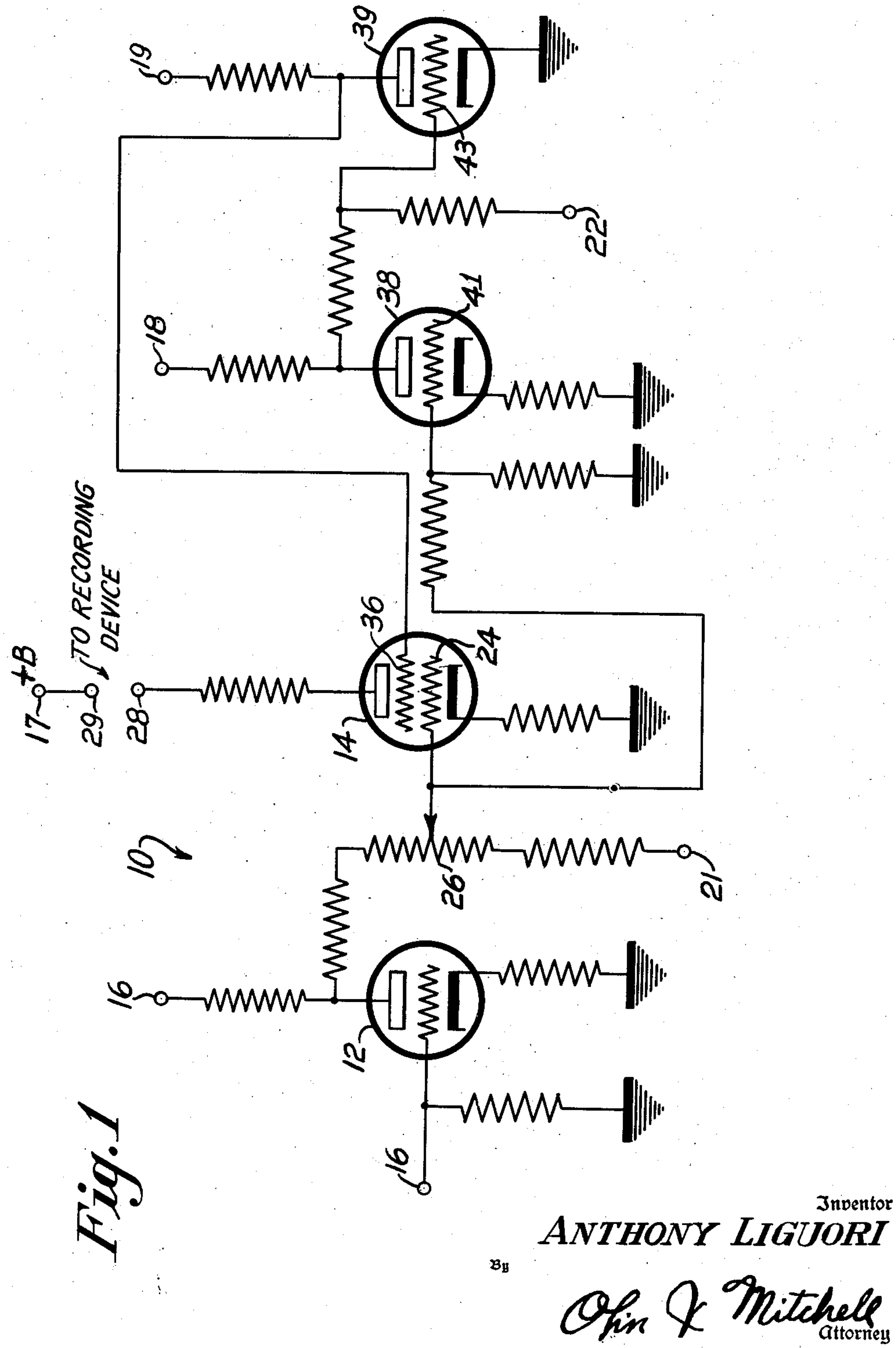
Figures 2, 3:
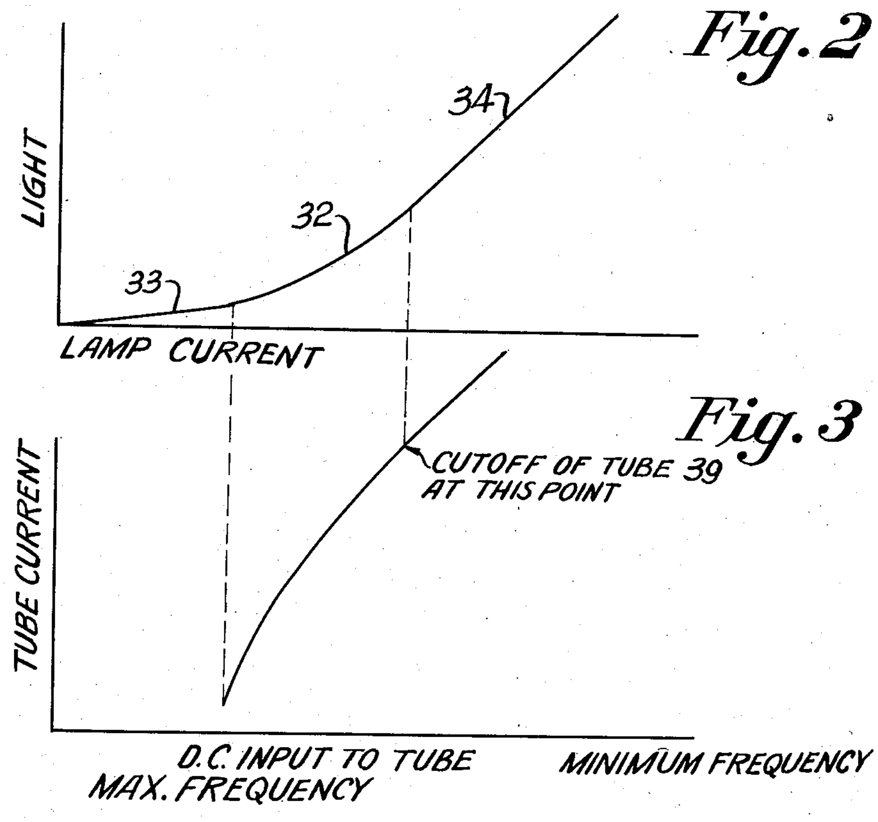
Figure 4:
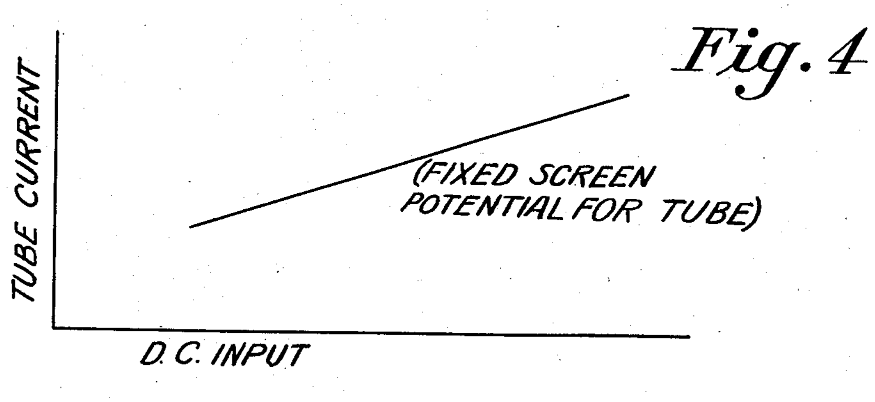

Other objects and advantages of the present invention will, of course, become apparent and immediately suggest themselves to those skilled in the art to which the invention is directed from a reading of the following specification in connection with the accompanying drawings, in which:

Fig. 1 shows diagrammatically one suitable form of amplifier embodying the invention; and Figs. 2, 3 and 4 inclusive show various curves referred to in explaining the invention.

Referring to the drawing and for the present to Fig. 1, there is shown an amplifier 10 comprising two stages of amplification provided by tubes 12 and 14. A terminal 16 and ground provide the input terminals for the amplifier 10 in the illustrative example. A direct current signal derived, for example, as a result of scanning a piece of subject copy in a facsimile machine (not shown) is applied to the terminal 16 and ground in operation of the system of this invention. This facsimile signal may be obtained at a receiving station from a frequency modulated carrier or subcarrier which is frequency modulated in accordance with the light values of the original subject copy. For example, the subcarrier may be frequency modulated so that black values in the subject copy will produce a relatively high carrier frequency and white portions of the subject copy will produce a low carrier frequency. Demodulation of this signal in any well known manner will provide an amplitude varying signal containing image or picture information. Demodulation may be obtained as disclosed in a copending application of Shenk and Liguori, Serial No. 789,788, filed December 5, 1947, and entitled "Demodulator for Facsimile Signals," now Patent No. 2,505,368, granted April 25, 1950. Other demodulating means may be employed and the system herein disclosed is effective with signal sources other than a facsimile scanner. In the assumed example, the demodulated signal will be a direct current signal having minimum negative amplitude for the black signal and maximum negative amplitude for the white signal. The amplifier 10 is direct current coupled, as indicated by the drawing, and comprises the usual bias voltage source (not shown) which is connected to terminals indicated schematically at 16 to 19. The same biasing source or an auxiliary biasing source (not shown) is connected to terminals 21 and 22 to provide suitable negative C bias.

The method of connecting voltage supply sources and the like, the tube electrode in a direct coupled amplifier is by now well known, and it is believed that the diagrammatic indication given in the drawing will be sufficient to indicate the nature of the tube circuits employed to those skilled in the art. Solely by way of example, the voltage applied to the terminals 16 to 19 may be +225 volts and the voltage applied to the terminals 21 and 22 may be −150 volts. The coupling of the plate of the tube 12 to the control grid 24 of the tube 14 includes a volume control arrangement shown schematically and conventionally as a potentiometer 26.

The output or plate circuit of the tube 14 includes means, indicated schematically as terminals 28 and 29, across which a recording device may be connected. The recording device is in series with the plate circuit of the tube 14. Other utilization devices and other couplings or connections may be employed in practicing the invention. The recording device (not shown) is of a character to produce light for the exposure of a recording medium such as a photographic film. For example, the recording device in accordance with the invention may be a glow modulator tube which produces a light output which varies with the current passing through the glow modulator tube. The glow modulator tube serves as a recording lamp. A glow modulator tube of this type is discussed in the March 1946 issue of "Electronics."

Fig. 2 of the drawings shows a characteristic curve of a typical glow modulator tube serving as a recording lamp, and it may be seen that the curve includes a non-linear portion 32 and two substantially linear portions 33 and 34. The portion 33 is not particularly useful for recording purposes inasmuch as the variations in light output for changes in lamp current are not strongly marked. The most useful range of the characteristic of Fig. 2 includes the non-linear portion 32 and the linear portion 34. This is especially true with certain types of recording media which may be exposed at relatively high values of illumination.

In accordance with the arrangement so far described, and which may operate in accordance with the prior art practice, it will be seen when a direct current signal varying between —5 volts and —11 volts, for example, is applied between the terminal 16 and ground, that the light output of the recording lamp will vary. In the illustrative arrangement, the signal having the value of —5 volts is assumed to correspond to the scanning of a black portion of the image and the —11 volt signal is assumed to correspond to the scanning of the white portion of the image. When the input signal to the amplifier 10 has the assumed value of —5 volts, the current through the recording device will be a minimum and, therefore, the illumination will be low. On the other hand, when the input signal has a value of —11 volts, the current through the recording lamp will be a maximum and the light output will be at the maximum value. This range of operating voltages embraces the portions 32 and 34 of the characteristic curve of the lamp shown in Fig. 2. The tube 14 is shown as being a tetrode, however, it may be a pentode tube, for example, a type 6V6 tube. The characteristic curve of this tube with a substantially fixed voltage applied to its screen electrode 36 is shown by Fig. 4 of the drawings. Such a characteristic would not cause the output of this tube to match the combined portions 32 and 34 of the lamp characteristic of Fig. 2.

In accordance with the invention, the screen voltage of the tube 14 is caused to vary in such a way that the output of this tube compensates for the non-linear portion 32 of the characteristic curve of the lamp and the linear output of the tube beyond this point is suitable for operation of the lamp in the range indicated by the portion 34 of its characteristic curve.

In order to accomplish the desirable result just indicated, tubes 38 and 39 are provided which are connected in cascade as shown. This connection preferably includes physical or direct current coupling. The grid 41 of the tube 38 is connected to the potentiometer 26 so that the tube 38 operates on substantially the same input signal as the tube 14. The coupling between the tubes 38 and 39 is made by a physical connection to the grid 43 of the tube 39. As stated previously, methods of coupling the stages of a cascade direct current amplifier are by now well known. The tubes 38 and 39 may be the independent sections of a dual diode, such, for example, as the type 6SN7. Suitable biasing voltages for the purpose of carrying out the invention have been indicated in the foregoing.

In operation of the apparatus embodying this invention, the grid of the tubes 39 swings from a few volts negative to such a value as will cut off this tube. The cutoff point of the tube 39 is such that it ceases to influence the tube 14 when the recording lamp response becomes linear. This point is indicated approximately on the curve of Fig. 3 of the drawings. For a low frequency input into the demodulator (not shown), the rate of change of current as plotted against frequency is substantially constant. That is to say, that the resulting curve is substantially linear with a given slope. In the mid frequency range of input to the demodulator, which corresponds to the scanning of gray subject copy, the rate of change of current increases with the frequency increase. For the high frequency input to the demodulator which corresponds to the scanning of the black portion of the subject copy, the rate of change of current is greatest.

The operation of the apparatus of Fig. 1 will now be described in detail. The input signal to the amplifier 10 may be, as stated, a direct current signal resulting from the demodulation of a frequency modulated carrier signal derived in any known manner by scanning a piece of subject copy. The input signal is amplified and applied to the grid 24 of the tube 14. The signal on the grid of the tube 14 varies the current flow through this tube and through the recording lamp which is connected in series with it. Over the current range required for operation with certain types of recording media the response of the recording lamp is not linear, as indicated in Fig. 2. The compensating circuit described herein is used to make the light output linear with respect to linear signal input. The tubes 38 and 39 and their associated components constitute the compensation circuit. Part of the signal that is applied to the grid of the tube 14 is also applied to the tube 38 where it is amplified. It is then applied to the tube 39 where it is again amplified. The screen 36 of the tube 14 is directly connected to the plate of the tube 39 so that when the tube 39 conducts, the screen voltage on the tube 14 is comparatively low. When the tube 39 is non-conducting, the supply voltage for the screen of the tube 14 is B+ or +225 V. in the illustrative example.

As pointed out above, the output signal in the illustrative example becomes more positive as the frequency input increases. When a D. C. signal resulting from a higher frequency input to the demodulator is applied to the tube 12, the plate of the tube 12 and the grid of the tube 14 become more negative. The current flow through the tube 14 and the recording lamp is small. The same negative signal that is applied to the grid of the tube 14 is also applied to the grid of the tube 38. The plate of the tube 38 and the grid of the tube 39 become positive. The tube 39 will conduct and the tube 14 screen voltage will be low. As the input frequency to the demodulator decreases, the input signal to the tube 12 becomes more negative. The plate of the tube 12 and the grid of the tube 14 become more positive and more current flows through the tube 14 and the recording lamp. This increasing positive signal from the grid of the tube 14 is also applied to the grid of the tube 38. The plate of the tube 38 and the grid of the tube 39 become more negative. Less and less current flows through the tube 39 until the tube 39 is cut off. As the current through the tube 39 decreases, the tube 14 screen voltage increases and so does the amplification of the tube 14. The current through the tube 14 and the recording lamp increases faster than the linear voltage increases on the grid of the tube 14. Through part of the input frequency range, for example, in the lower part, the tube 39 is entirely cut off so that tube 14 screen supply voltage does not vary. The current flow is controlled entirely by the grid voltage on the tube 14.

Having now described the invention, what is claimed and desired to be secured by the Letters Patent is the following:

Apparatus for providing signals to an electric current operated device serving to produce an image record, said device having a combined non-linear and linear response characteristic with respect to current input and recording output, said apparatus comprising an amplifier tube having an anode, a cathode and a control electrode, means for applying negative going signals representing the scanning of an image to said control electrode and said cathode, the lighter portions of said image producing a more negative signal, a second tube having at least a control electrode, a screen electrode, a cathode and anode, a connection from the anode of said first tube to the control electrode of said second tube, a third tube having a cathode, an anode and a control electrode, means to transfer the signal from said first tube to said third tube, a source of positive potential connected to the anode of said third tube and to the screen electrode of said second tube, said third tube controlling the screen potential and hence amplification of said second tube when said input signal is of a level to cause operation of said electric current operated device in the non-linear portion of its response characteristic thereby substantially to compensate for said non-linearity, said third tube being cut off when said input signal is of a level to cause operation of said device in the linear portion of its characteristic.

ANTHONY LIGUORI.

REFERENCES CITED

The following references are of record in the file of this patent:

UNITED STATES PATENTS

| Number | Name | Date |
|---|---|---|
| 2,219,729 | Tahon | Oct. 29, 1940 |
| 2,272,788 | Bishop | Feb. 10, 1942 |
| 2,293,528 | Barco et al. | Aug. 18, 1942 |